United States Patent [19]
Konno

[11] Patent Number: 5,835,703
[45] Date of Patent: Nov. 10, 1998

[54] APPARATUS AND METHOD FOR DIAGNOSING DISK DRIVES IN DISK ARRAY DEVICE

[75] Inventor: Shigeo Konno, Kawasaki, Japan

[73] Assignee: Fujitsu Limited, Kawasaki, Japan

[21] Appl. No.: 993,037

[22] Filed: Dec. 18, 1992

[30]   Foreign Application Priority Data

Feb. 10, 1992   [JP]   Japan ................................. 4-023751

[51] Int. Cl.[6] ................................................ G06F 11/00
[52] U.S. Cl. ................................. 395/183.18; 395/183.17
[58] Field of Search ........................... 395/575, 182.03, 395/182.04, 182.05, 182.18, 185.07, 441, 183.17; 371/10.1, 10.2, 21.1

[56]         References Cited

U.S. PATENT DOCUMENTS

| | | | |
|---|---|---|---|
| 4,092,732 | 5/1978 | Ouchi ..................................... | 364/900 |
| 4,775,978 | 10/1988 | Hartness ................................. | 371/38 |
| 4,817,035 | 3/1989 | Timsit .................................... | 364/900 |
| 4,849,927 | 7/1989 | Vos ........................................ | 367/900 |
| 4,899,342 | 2/1990 | Potter et al. .......................... | 371/10.1 |
| 5,088,081 | 2/1992 | Farr ....................................... | 371/10.1 |
| 5,113,371 | 5/1992 | Hamada et al. ....................... | 365/200 |
| 5,148,432 | 9/1992 | Gordon et al. ........................ | 371/10.1 |
| 5,159,671 | 10/1992 | Iwami .................................... | 395/575 |
| 5,177,744 | 1/1993 | Cesare et al. ......................... | 371/10.1 |
| 5,357,509 | 10/1994 | Ohizumi ................................ | 371/10.1 |

*Primary Examiner*—Robert W. Beausoliel, Jr.
*Assistant Examiner*—Joseph E. Palys
*Attorney, Agent, or Firm*—Greer, Burns & Crain, Ltd.

[57]         ABSTRACT

In an apparatus and method for diagnosing a plurality of disk drives in at least one disk array device, including a disk array control unit which is connected in parallel with a plurality of data storage disk drives, a redundant disk drive and a spare storage disk drive, and which is adapted to access the plurality of disk drives in parallel in response to an access from a host device. The disk array control unit accesses the spare storage disk drive as well as the plurality of data storage disk drives and the redundant storage disk drive, in accordance with a data transfer requirement from the host device, thereby diagnosing the storage disk drive, when the data transfer requirement represents a read transfer or write transfer.

24 Claims, 16 Drawing Sheets

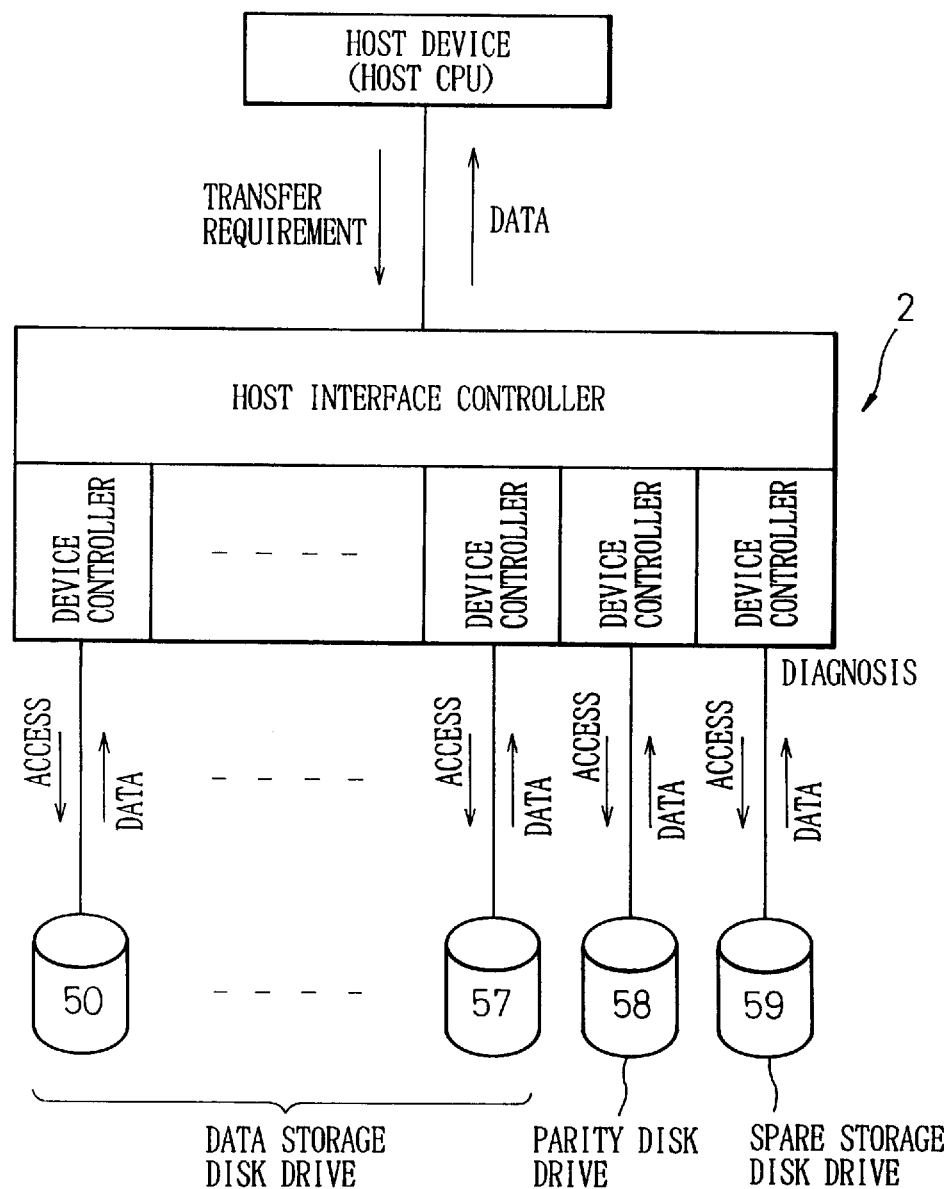

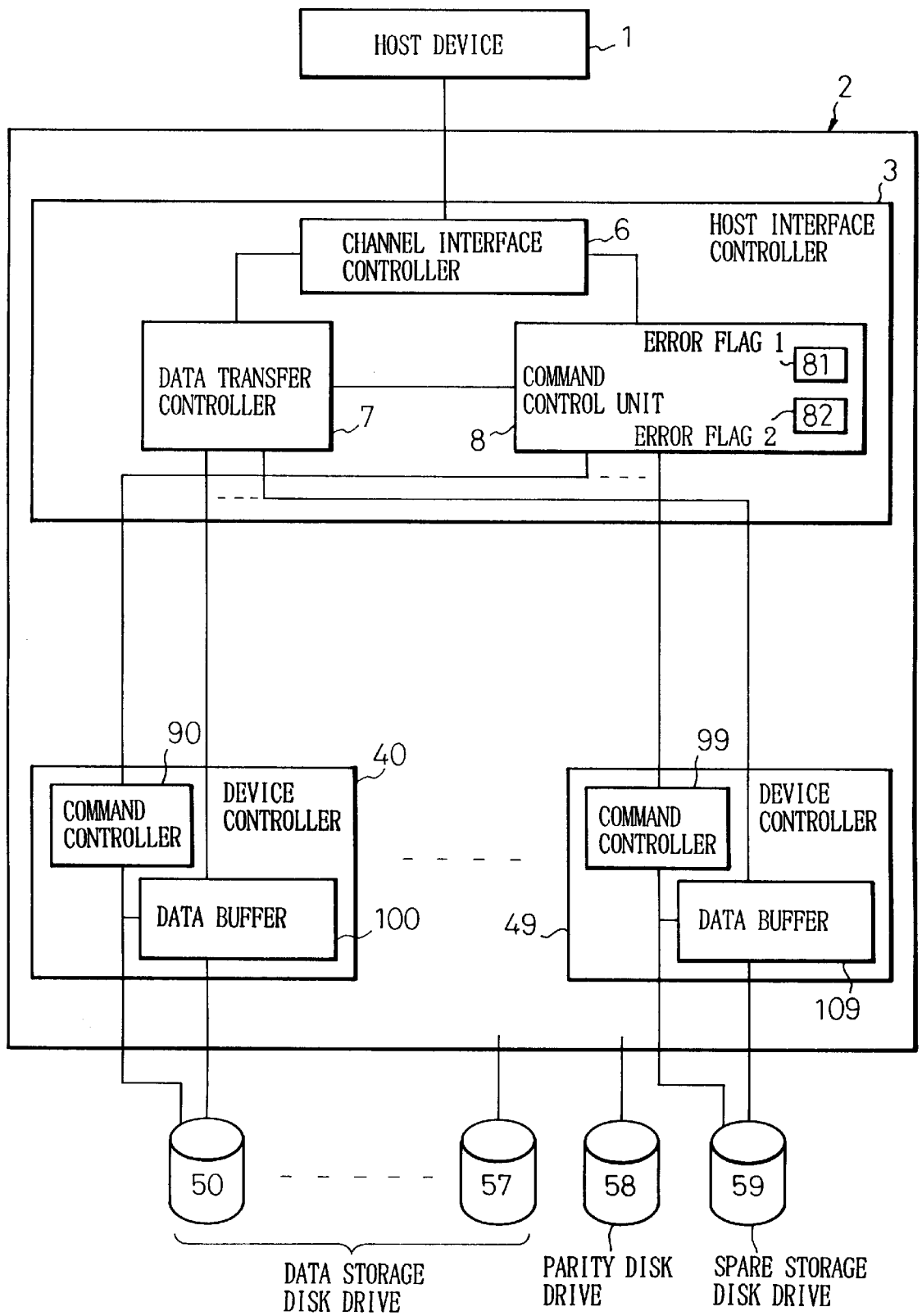

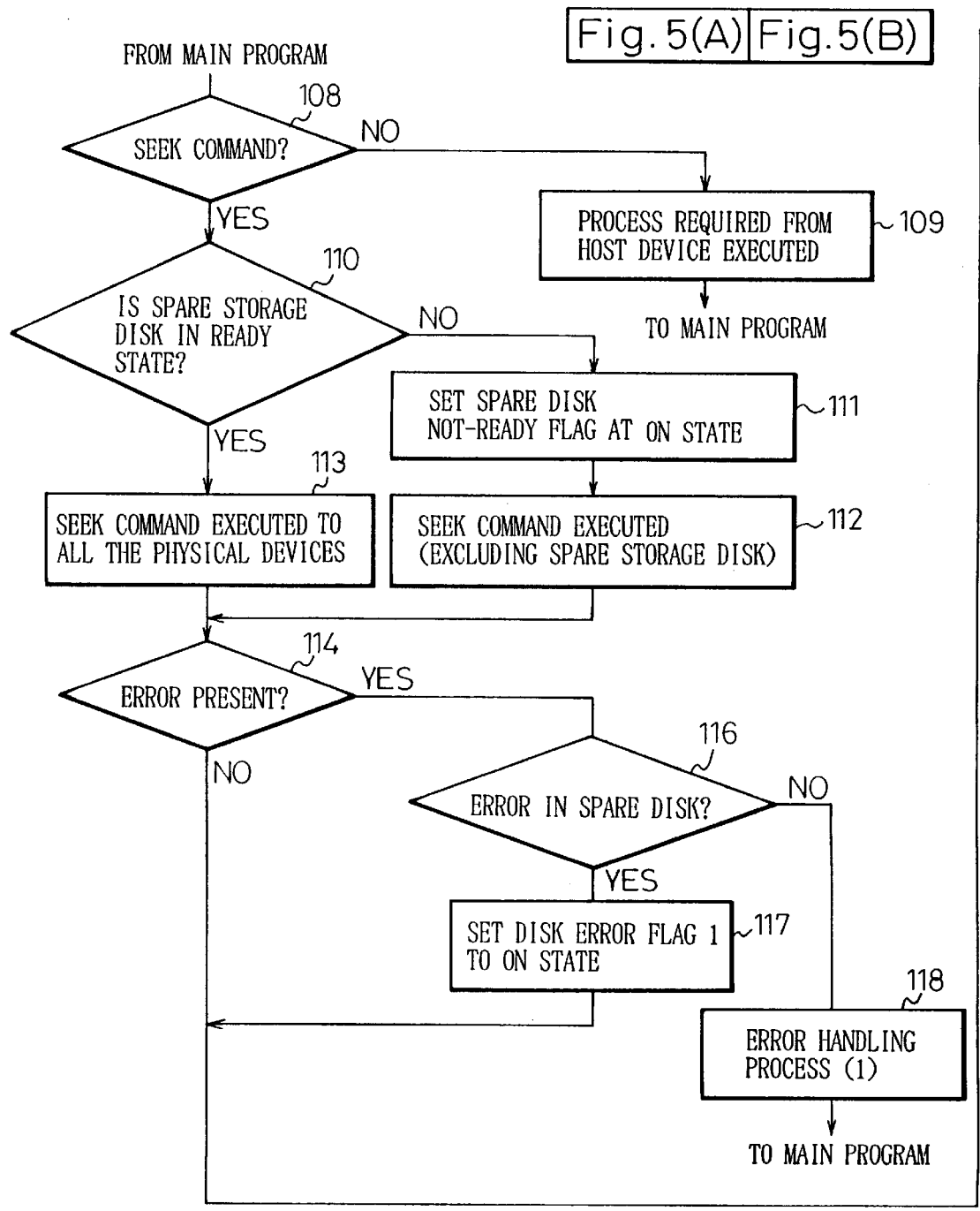

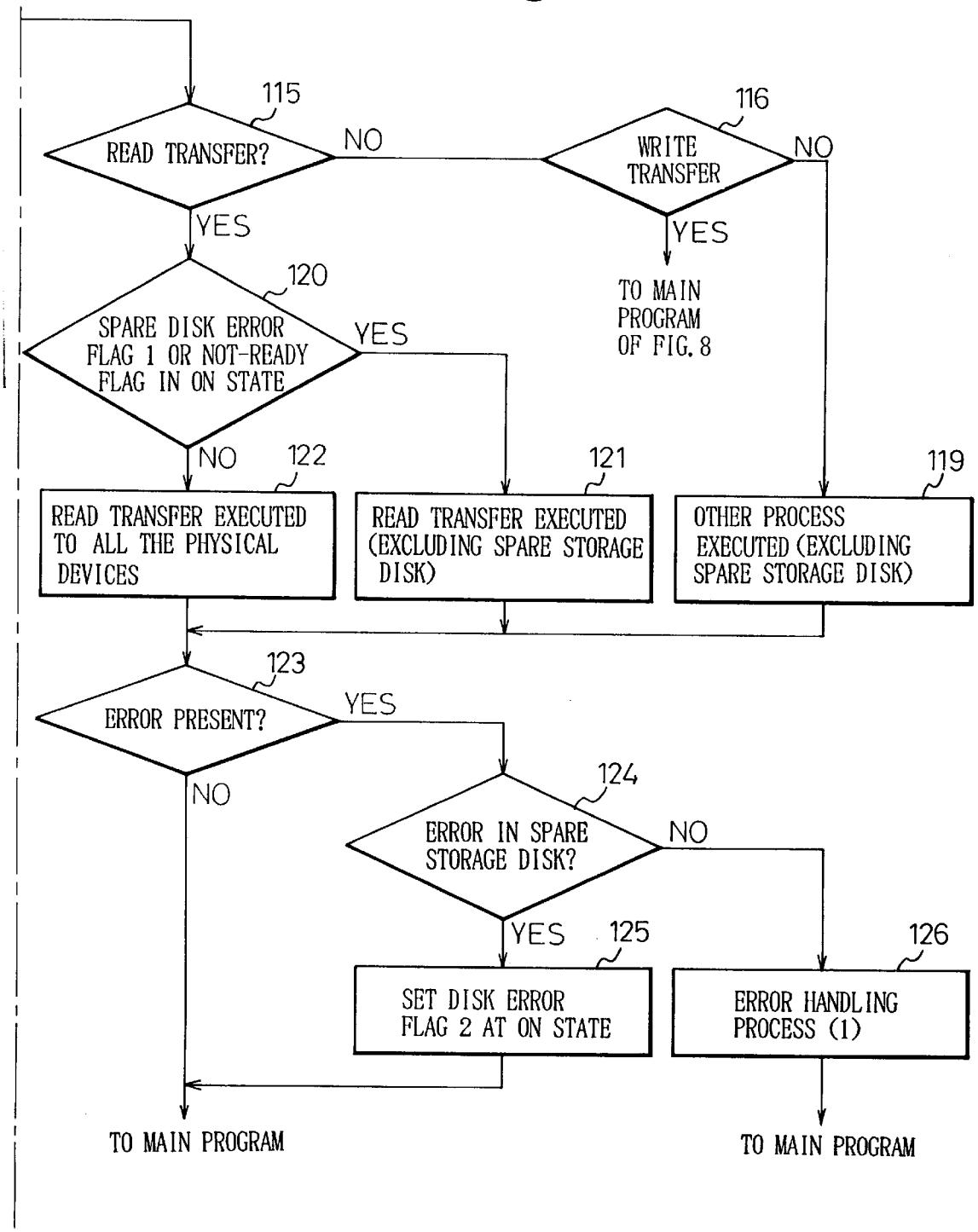

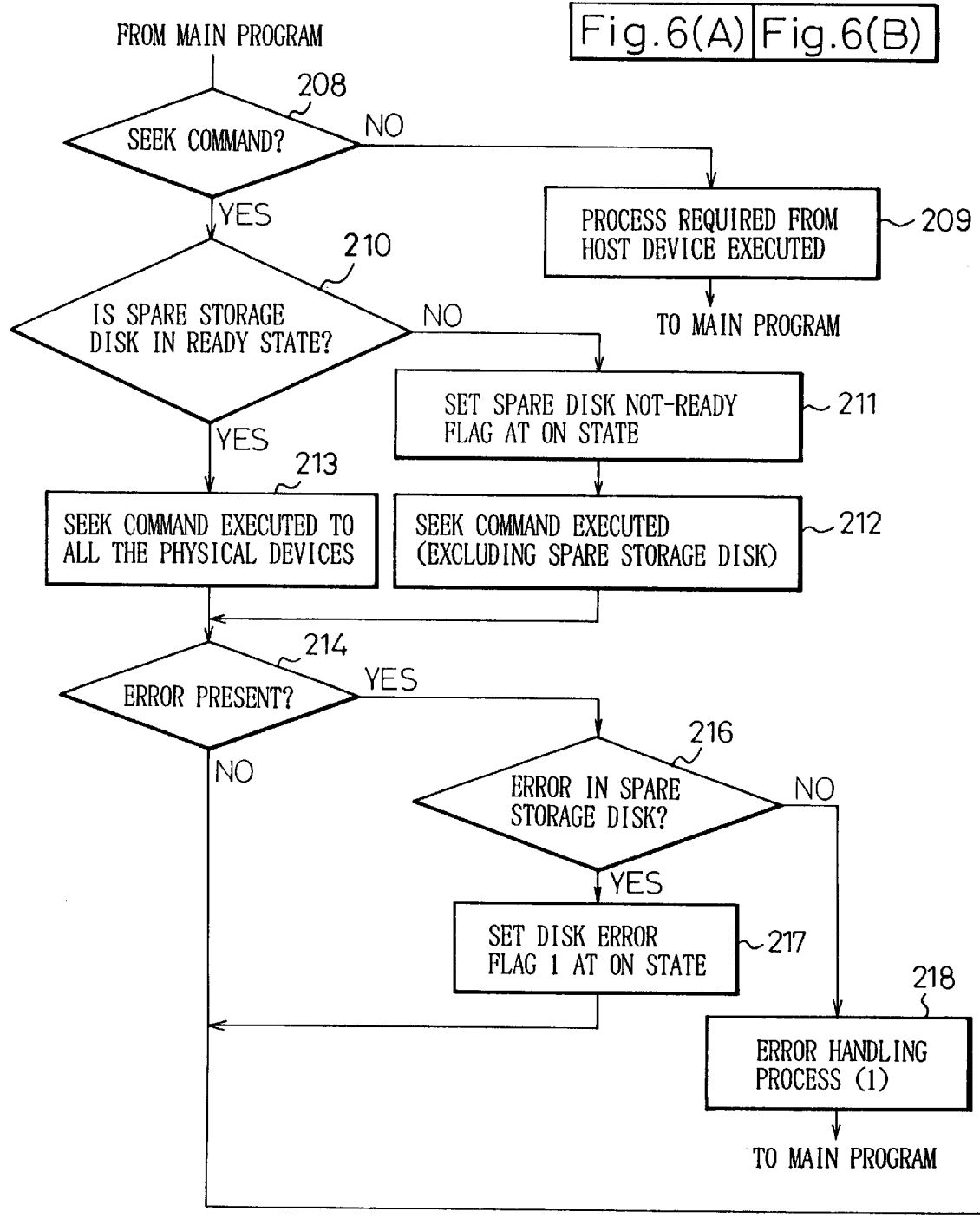

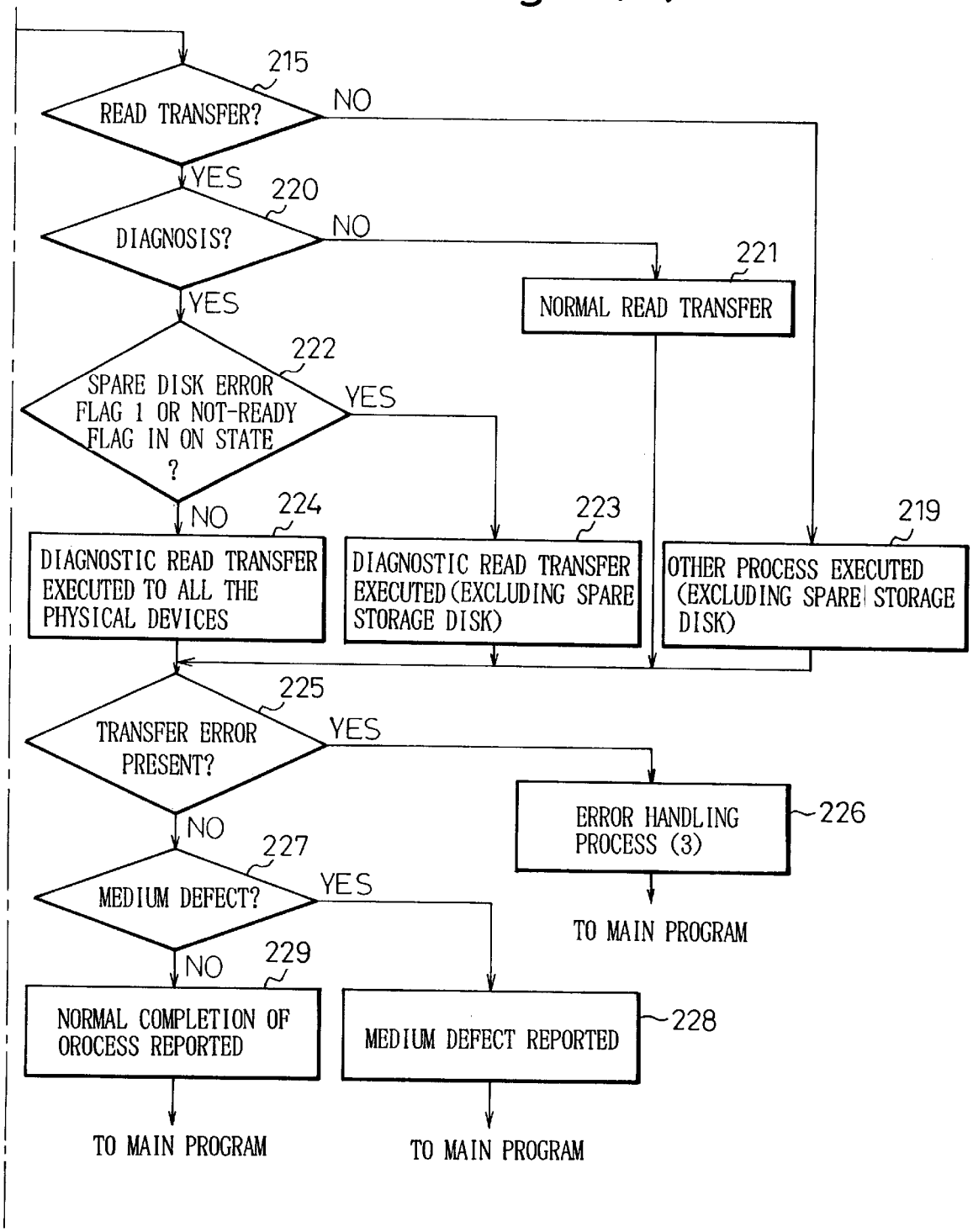

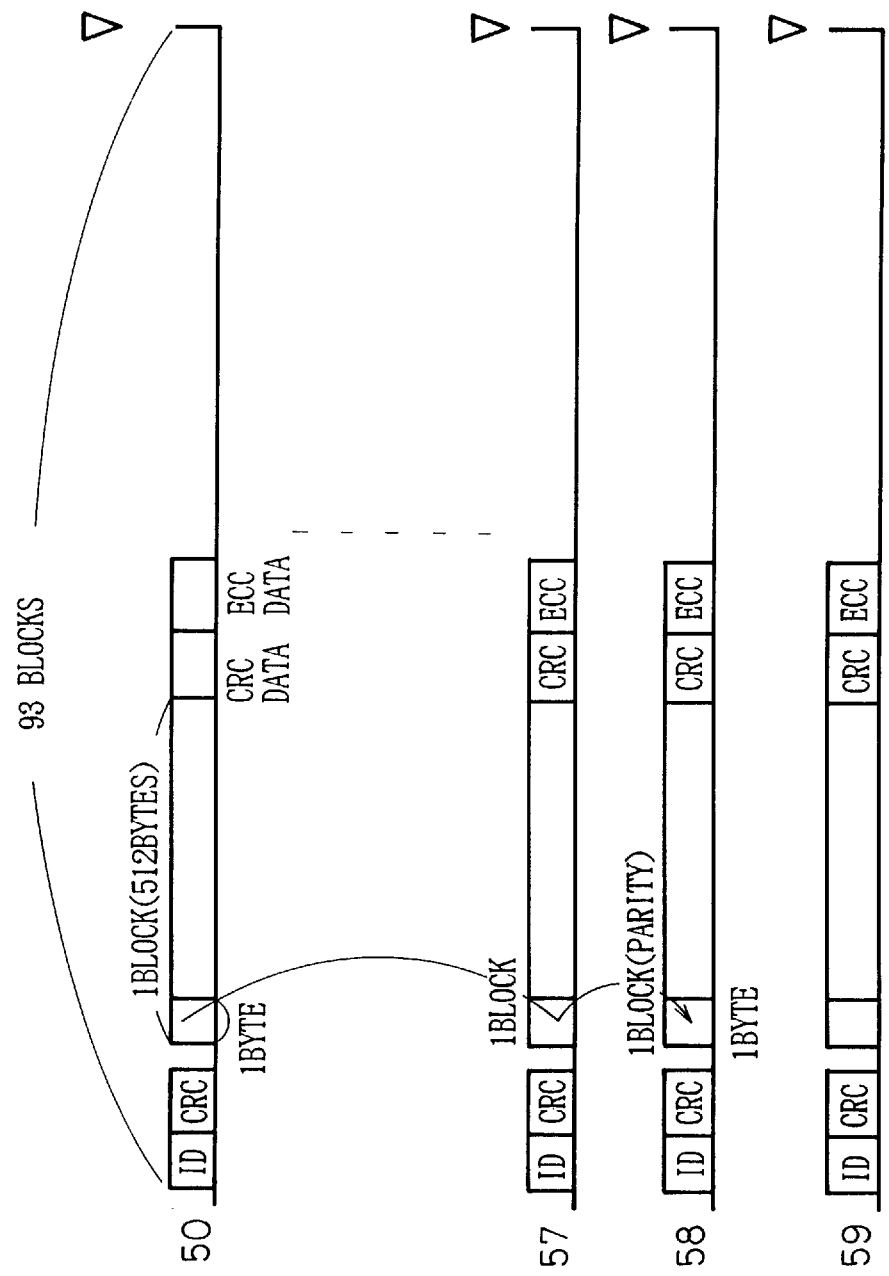

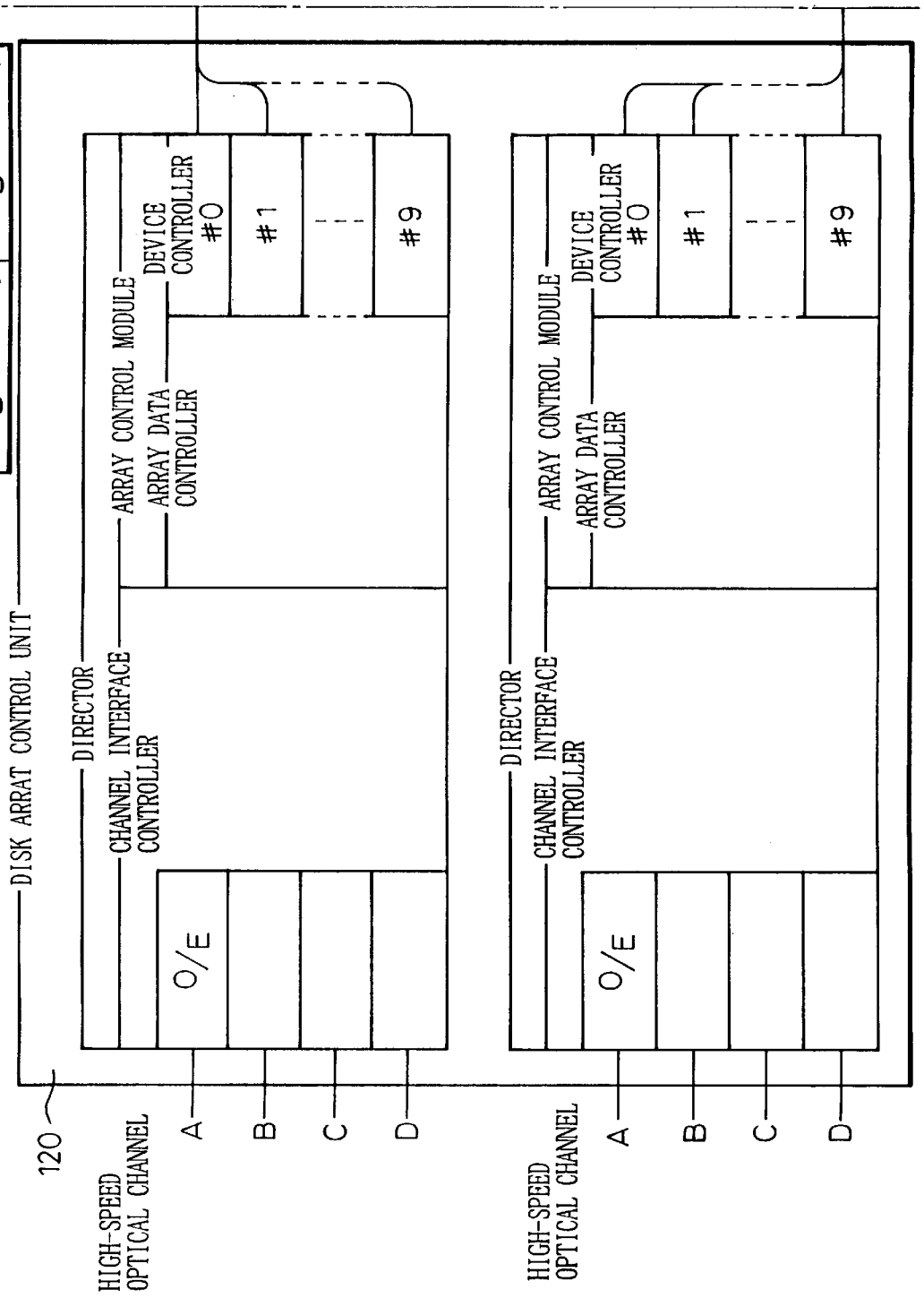

APPARATUS AND METHOD FOR DIAGNOSING DISK DRIVES IN DISK ARRAY DEVICE

BACKGROUND OF THE INVENTION

1. Field of the Invention

The present invention relates to an apparatus and method for diagnosing a plurality of disk drives included in at least one disk array device.

More particularly, the present invention relates to an apparatus and method for diagnosing a spare storage disk drive which is only used in the event of a failure in the disk array device, as sufficiently as any other disk drive, in connection with an operation of a host device such as a host computer.

There is recently a tendency to demand, in a computer system, a transfer of large amounts of data such as image data at high speed, and therefore, an auxiliary storage device is also required to transfer large amounts of data at high speed to exchange data with a host device, when a command for an access is issued from the host device.

To meet this requirement, an auxiliary storage device, e.g., magnetic disk array device, has been developed, which is mainly constituted from at least one logical device including a plurality of physical devices such as several units of disk drives, and which enables plural bytes of data to be transferred in parallel between the host device and the logical device.

2. Description of the Related Art

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform read/write operations in parallel by driving a plurality of disk drives, called disk array device, simultaneously. At this time, in response to a command for an access from a host device, the spindle motors of the magnetic disk drives, such as a disk array device connected in parallel with the host device, are synchronously rotated, so that it becomes possible to perform a parallel transfer of data.

Further, in addition to the data transfer at high speed, fault tolerance of the whole system is also required for the disk array device so that sufficient reliability for the large amounts of data can be ensured without decreasing the data transfer speed.

To attain such a fault tolerant system, even though a failure, such as the inability to read data from one disk drive of a plurality of disk drives, has occurred, it is necessary for the disk array device to be constructed so that the data of the failed disk drive can be reconstructed immediately without stopping operation of the whole system of the disk array device.

Some kinds of disk array devices in practical use, in which the above-mentioned data transfer at high speed and the fault tolerance can be satisfied simultaneously, have begun to be announced by various computer manufacturers as disk array devices called RAID (Redundant Arrays of Inexpensive Disks) 1 to RAID 5.

Among these RAIDs 1–5, RAID 3, which is especially adequate for the case where large amounts of data have to be processed continuously at high speed, e.g., for scientific calculations or image data processing, will now be described in more detail.

In the RAID 3, the disk array device typically include a plurality of disk drives for data transfer (for example, eight (8) disk drives), i.e., working storage disk drives, and a disk drive for parity checking, all these disk drives operating in parallel simultaneously. In this case, some given parity data corresponding to the parallel data of the respective disk drives for data transfer is previously stored on the disk drive for parity checking (parity disk drive). In such a construction, even though one disk drive of a plurality of disk drives fails so that the data cannot be read out, the data can be reconstructed by reading the parity data from the parity disk drive.

Further, in the RAID 3, a spare storage disk drive is also provided. All the data on the failed disk drive is automatically reconstructed and transferred onto the spare storage disk drive. If such a data reconstruction process is completed, the spare storage disk drive can be utilized as a normal disk drive, in cooperation with the other disk drives for data transfer.

In this manner, a disk array device as represented by the RAID 3, which enables large amounts of data to be transferred at relatively high speed (for example, 36 MBytes/sec) and has substantially fault tolerant characteristics, can be realized.

Namely, in such a disk array device, a spare storage disk drive is usually provided so that it can be replace one of the working storage disk drives at any time. When one of the working storage disk drives fails, the spare storage disk drive is used in place of the failed disk drive, but the spare storage disk drive is not normally used.

In view of this, it is necessary to diagnose such a spare disk drive in case a failure or the like occurs.

FIGS. 1(A) and 1(B) are a block diagram and a flow chart showing an apparatus for diagnosing such disk drives according to a prior art, respectively.

In this case, a magnetic disk array system, which is constituted by one disk array device, is illustrated representatively.

As shown in FIG. 1(A), the one disk array device includes a magnetic disk array control unit 2 connected to a host device (a host CPU) 1 and a plurality of magnetic disk drives 50 to 59 connected in parallel with the magnetic disk array control unit 2.

A unit of data to be transferred is divided into eight sections, which are in turn stored in the data storage magnetic disk drives 50 to 57. Parity data for the data is stored in the parity (redundant) magnetic disk drive 58. For instance, if it is assumed that 4096 bytes constitute one unit of data to be transferred, one eighth of the unit, namely 512 bytes (1 block), is stored in each of the data storage magnetic disk drives 50 to 57, and the parity data for that unit of data is stored in the parity magnetic disk drive 58.

By providing the redundant magnetic disk drive 58, even if one of the data magnetic disk drives 50 to 57 fails, data stored in the failed magnetic disk drive can be reconstructed from the remaining disk drives including the redundant magnetic disk drive 58.

Further, by providing the spare storage magnetic disk drive 59, the data reconstructed from the redundant magnetic disk drive 58 and a plurality of data storage magnetic disk drives can be stored in the spare storage magnetic disk drive 59, thereby enabling the whole system of the disk array device to have a high fault tolerance in event of a failure of the magnetic disk drive.

This magnetic disk array control unit 2 includes a host interface controller 3 for controllably interfacing the unit 2 with the host device 1, and device controllers 40 to 49 for controlling the respective magnetic disk drives 50 to 59.

In such a disk array device, when a read access is made by the host device 1, the host interface controller 3 causes the respective magnetic disk drives 50 to 58 to carry out a seek operation by controlling the device controllers 40 to 48. Upon completion of the seek operation, a data transfer operation is started from the magnetic disk drives 50 to 58.

The data from the magnetic disk drives 50 to 58 are input to the host interface controller 3 in parallel through the device controllers 40 to 48. In the controller 3, a parity check is performed using 8 bytes of data and 1 byte of parity data, and the 8 bytes of data are transferred to the host device 1 by the host interface controller 3.

On the other hand, when a write access is made from the host device 1, the host interface controller 3 causes the respective magnetic disk drives 50 to 58 to carry out a seek operation by controlling the device controllers 40 to 48. Upon completion of the seek operation, the data transfer operation is started from the host device 1.

The data from the host device 1 is transferred to the host interface controller 3 in which 1 byte of parity data is generated for each 8 bytes of data. Then, 8 bytes of data are written on the magnetic disk drives 50 to 57 for each byte by the device controllers 40 to 47, and 1 byte of parity data is written on the parity magnetic disk drive 58.

Incidentally, the host device 1 normally accesses the magnetic disk drives including the parity magnetic disk drive 58. Thus, the data is not written on or read from the spare storage magnetic disk drive 59 which becomes effective only at the time of data reconstruction.

In order to operate the spare storage magnetic disk drive 59 normally at the time of data reconstruction, it is necessary to check in advance whether or not the disk drive 59 is operating in a normal manner in case of an emergency, by using a certain means.

Accordingly, in the conventional disk array device, a patrol diagnosis is applied only to the spare storage magnetic disk drive 59 using spare time of the system during which no access is made by the host device 1 as shown in FIG. 1(B), thereby confirming the normal operation of the disk drive 59.

However, the following problems have existed in the prior art as described with reference to FIGS. 1(A) and 1(B).

(1) Since the diagnosis is applied only to the spare storage magnetic disk drive 59, the normal operation must be confirmed by means of an operation performed in cooperation with a host device and with the other disk drive which becomes necessary in event of a failure.

(2) The diagnosis is applied using the spare time of the disk array device during which no access is made by the host device 1. Accordingly, in the case where an access frequency of the host device 1 is relatively high, it is difficult to carry out the diagnosis sufficiently.

Especially, when relatively large amounts of data are processed in scientific calculations, image data processing, etc., using the disk array device, spare time is difficult to find. Consequently, the diagnosis of the spare storage disk drive is likely to be limited to a simplified level as in the patrol diagnosis.

SUMMARY OF THE INVENTION

Accordingly, it is the main object of the present invention to provide an apparatus and method for diagnosing a plurality of disk drives in at least one disk array device, in which a storage disk drive can be assuredly used in place of a failed disk drive in case that a failure or the like has occurred.

It is a further object of the present invention to provide an apparatus and method for diagnosing the disk drives in the disk array device, which enable a diagnosis of a spare storage disk drive to be carried out in connection with an operation of a host device, as well as the diagnosis of the other disk drives.

It is a still further object of the present invention to provide an apparatus and method for diagnosing the disk drives in the disk array device, which enable a diagnosis of a spare storage disk drive to be sufficiently carried out even if an access frequency of a host device is high.

It is a still further object of the present invention to provide an apparatus and method for diagnosing the disk drives in the disk array device, in which disturbance of data transfer at high speed can be avoided.

To attain the above objects, in the apparatus for diagnosing a plurality of disk drives in at least one disk array device according to the present invention, the above disk array device includes a plurality of data storage disk drives, a redundant disk drive for redundancy check, a spare storage disk drive, and a disk array control unit that is connected in parallel with said plurality of disk drives and that is adapted to access the plurality of disk drives in parallel in response to an access from a host device. Further, such a disk array control unit has means for accessing the spare storage disk drive as well as the plurality of data storage disk drives and the redundant disk drive in accordance with a data transfer requirement from the host device, so as to diagnose the spare storage disk drive.

Preferably, the disk array control unit of the apparatus is operative to access the spare storage disk drive as well as the data storage disk drives and the redundant storage disk drive, when the data transfer requirement from the host device represents a read transfer, so as to diagnose the spare storage disk drive.

Further, preferably, such a disk array unit is operative to access the spare storage disk drive as well as the other disk drives, when the data transfer requirement represents a diagnosis. In this case, the apparatus is operative to diagnose the spare storage disk drive, but it is not operative to transfer data to the host device.

Alternatively, the disk array control unit of the apparatus is operative to access the spare storage disk drive as well as the other disk drives, when the data transfer requirement from the host device represents a write transfer, so as to diagnose the spare storage disk drive.

Further, preferably, such a disk array is operative to access the spare storage disk drive as well as the other disk drive, when the data transfer requirement represents a diagnosis. In this case, the apparatus is operative to diagnose the spare storage disk drive and to write data into the spare storage disk drive.

More concretely, the diagnosis includes seek operations and data transfer operations for the storage disk drive, or further includes defect detecting operations for the recording medium of the disk drive.

Furthermore, the method according to the present invention can be executed in accordance with the principle of the apparatus according to the present invention described before.

BRIEF DESCRIPTION OF THE DRAWINGS

FIG. 2 is block diagram showing an essential embodiment based on the principle according to the present invention;

FIG. 3 is a block diagram showing a first embodiment according to the present invention;

FIGS. 5(A) and 5(B) are flowcharts each showing a process in a first embodiment according to the present invention;

FIGS. 6(A) and 6(B) are flowcharts each showing a process in a second embodiment according to the present invention;

FIG. 7 is a time chart for explaining a second embodiment according to the present invention;

FIGS. 13(A) and 13(B) are block diagrams of a magnetic disk array control unit and the overall disk array devices, respectively.

DESCRIPTION OF THE PREFERRED EMBODIMENTS

Figure 1A:
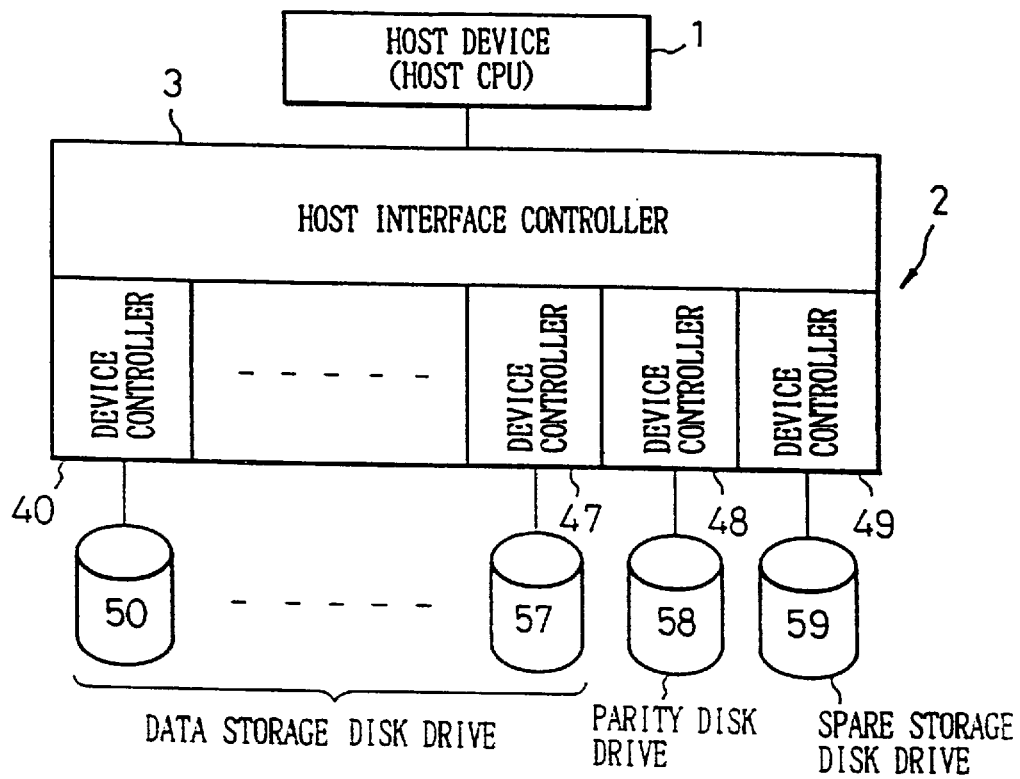
FIGS. 1(A) and (B) are a block diagram and a flowchart showing an apparatus for diagnosing a plurality of disk drives according to a prior art, respectively.

FIG. 2 is a block diagram showing an example based on the principle according to the present invention.

The embodiment shown in FIG. 2 is directed to an apparatus for diagnosing a plurality of disk drives in an disk array device including a plurality of data storage disk drives 50 to 57, a parity (redundant) disk drive 58, a spare storage disk drive 59, and a disk array control unit 2 which is connected in parallel with the plurality of data storage disk drives 50 to 59 and which is adapted to access the plurality of disk devices 50 to 59 in parallel in response to an access from a host device 1. In this case, the disk array control unit 2 accesses the spare storage disk drive 59, as well as the plurality of data storage disk drives 50 to 57 and the parity disk device 58 in accordance with a data transfer requirement from the host device 1, thereby to diagnose the spare storage disk device 59.

Further, the embodiment shown in FIG. 2 is characterized in that the disk array control unit 2 accesses the spare storage disk drive 59, as well as the plurality of data storage disk drives 50 to 57 and the parity storage disk drive 58 when the data transfer requirement from the host device 1 represents a read transfer (or write transfer), thereby to diagnose the storage disk drive 59.

Further, the embodiment shown in FIG. 2 is characterized in that the disk array control unit 2 accesses the spare storage disk drive 59, as well as the plurality of data storage disk drives 50 to 57 and the parity disk drive 58, when the data transfer requirement from the host device 1 represents a diagnosis, thereby to diagnose the spare storage disk drive 59, but the disk array control unit 2 does not transfer data to the host device 1.

Further, the embodiment shown in FIG. 2 is characterized in that the diagnosis includes a seek operation and a data transfer operation for the spare storage disk drive 59.

Further, the embodiment shown in FIG. 2 is characterized in that the diagnosis includes seek operations, data transfer operations, and medium defect detecting operations for all the disk drives 50 to 59.

Further, the array disk control unit 2 accesses the spare storage disk drive 59, as well as the plurality of data storage disk drives 50 to 57 and the parity disk drive 58 in accordance with the data transfer requirement from the host device 1, thereby to diagnose the spare storage disk drive 59. Accordingly, it is possible to diagnose the normal operation of the spare storage disk drive 59 in cooperation with the other disk drives 50 to 58. Further, since the diagnosis is carried out while the access is being made by the host device 1, the spare storage disk drive 59 can be diagnosed even if an access frequency of the host device 1 is high.

Further, this embodiment can handle cases where some data is stored in the spare storage disk drive 59. Since the stored data is destroyed in the write transfer, the diagnosis is carried out when the data transfer requirement from the host device 1 represents the read transfer.

Further, the diagnosis is carried out when the data transfer requirement from the host device 1 represents the diagnosis. Accordingly, it is possible to diagnose the normal operation of the spare storage disk drives 59 in cooperation with the other storage disk drives 50 to 58 in testing the whole system or in confirming the operation thereof.

Further, since the diagnosis includes the seek operation and the data transfer operation for the spare storage disk drive 59, the diagnosis can be performed easily at high speed.

Further, since the diagnosis includes the seek operations, the data transfer operations, and the defect detecting operations in recording medium for all the disk drives 50 to 59, medium defects can also be confirmed.

Further, the diagnosis is carried out while the data are transferred from the host device 1 in accordance with the write instruction, in order to find that the write operation has been normally performed for the spare storage disk drive 59.

In this embodiment having a disk array device, the host device 1 such as a host CPU is adapted to control the disk array device not only as individual physical devices, but also as one logical device. Namely, the logical device is subjected to the diagnosis constituted by a program of the host CPU, which can ensure that all the physical devices and the interface between the physical devices operate normally.

Accordingly, even if the diagnosis including the spare storage disk drive 59 is carried out together with the diagnosis for the other physical devices (disk drives 50–58), such a diagnosis would have only a little influence on an access from the host device 1, by virtue of the disk array system.

FIG. 3 is a block diagram showing a first embodiment according to the present invention, showing a magnetic disk array system composed of one disk array device.

Figure 1B:
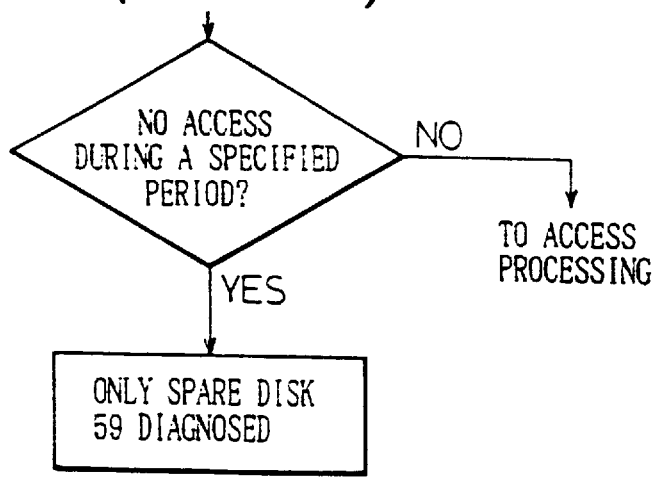

In this figure, like reference numerals designate like parts shown in FIGS. 1 and 2, respectively. The magnetic disk array control unit 2 is provided with a host interface controller 3 and a plurality of device controllers 40 to 49.

The host interface controller 3 includes a channel interface controller 6 for controllably interfacing a channel of a host device 1 with the unit 2, a command control unit (MPU) 8 for controlling a data transfer controller 7 and the device controllers 40 to 49 in accordance with a command from the host device 1, and the data transfer controller 7 for controlling a data transfer between the channel interface controller 6 and the device controllers 40 to 49 in accordance with a control of the command control unit 8.

The respective device controllers 40 to 49 include command controllers 90 to 99 for controlling seek, read, and write operations for the magnetic disk devices 50 to 59 in accordance with an instruction from the command control unit 8, and data buffers 100 to 109 for storing and checking data to and from the magnetic disk devices 50 to 59.

The command control unit (hereinafter referred to as a processor) 8 is provided with error flags 81, 82 (corresponding to error flags 1, 2) for storing errors detected when the spare storage magnetic disk drive 59 is diagnosed. In this case, the error flag 1 and error flag 2 indicate a seek error and a data transfer error, respectively.

Figure 4:
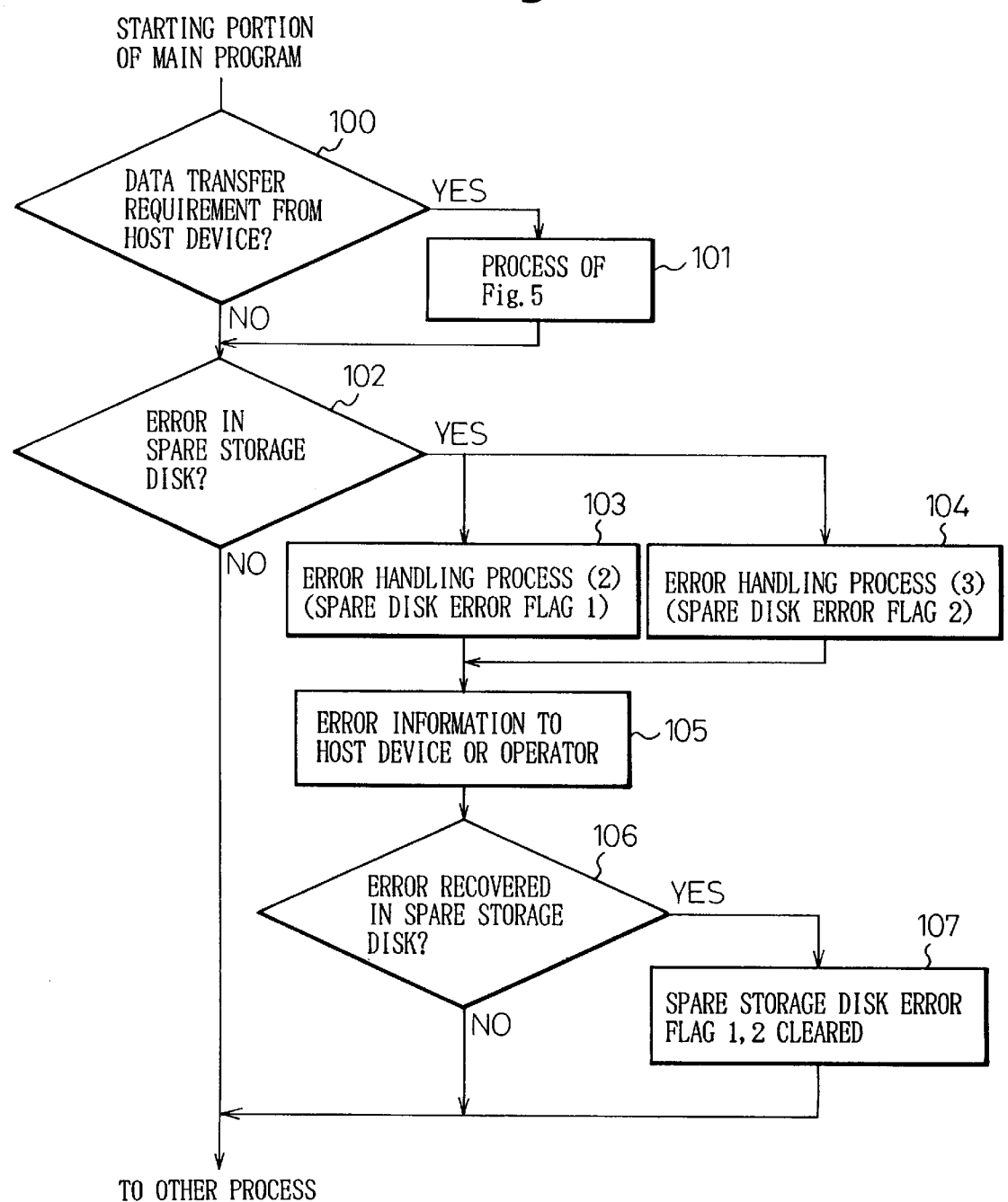
FIG. 4 is a flowchart for explaining a main process in a first embodiment according to the present invention.

FIG. 4 is a flowchart showing a main processing in the first embodiment of the present invention, and FIGS. 5(A) and 5(B) are flowcharts each showing a process in the first embodiment of the present invention.

Sequence (1)—the processor 8 decodes a command from the channel interface controller 6 [Step (100)]. Determining that there is a data transfer requirement, the processor 8 executes the process of FIGS. 5(A) [Step (101)] and 5(B) to be described later and proceeds to Step (102). Determining that there is no data transfer requirement, the processor 8 proceeds directly to Step (102).

Sequence (2)—then, the processor 8 checks the error flags 81, 82 (error flags 1, 2) so as to discriminate whether or not there has been any error in the spare storage disk drive 59. If there has been no error, the processor 8 proceeds to another process.

On the other hand, if there has been any error, the processor 8 executes an error handling process. More specifically, if the spare disk error flag 81 is set to "1," it means that a seek error has been detected, and accordingly an error handling process (2) is executed [Step (103)]. On the other hand, if the spare disk error flag 82 is set to "1," it means that a transfer error has been detected, and accordingly an error handling process (3) [Step (104)] is executed. In this way, the presence of error is informed to the host device 1 or to an operator [Step (105)].

Thereafter, the processor 8 checks whether or not the error in the spare disk has been eliminated by means of replacement [Step (106)]. If the error has been eliminated, the error flags 81, 82 are cleared [Step (107)], the processor 8 proceeds to other processing. If the error has not been eliminated, the processor 8 proceeds to the other process directly.

In this way, a main program shown in FIG. 4 is completed.

Next, the process of FIGS. 5(A) and 5(B) will be described.

Sequence (3)—discriminating that there is a data transfer requirement in Sequence (1), the processor 8 discriminates whether or not the data transfer requirement is a seek command [Step (108)]. If the data transfer requirement is not a seek command (for example, a state detection command, etc.), the processor 8 returns to the main program after executing the process required by the host device 1 [step (109)].

Sequence (4)—the processor 8 checks whether or not the spare storage disk drive 59 is in a ready state (standby state) in order to confirm the state of the spare storage disk drive 59 [Step (110)]. Unless the spare storage disk drive 59 is in the ready state due to a power supply being turned off, the processor 8 sets the spare disk not-ready flag to an on state [Step (111)]. Thereafter, the processor 8 sends the seek command to the device controllers 40 to 48 for the disk drives 50 to 58 other than the spare storage disk drive 59 without accessing the spare storage disk 59 [Step (112)], thereby causing the disk drives 50 to 58 to each carry out a seek operation so as to be positioned at a target track, and then proceeds to Step (114).

On the other hand, if the spare storage disk drive 59 is in the ready state, the processor 8 sends the seek command to the device controllers 40 to 49 for all the disk drives (physical devices) 50 to 59 [Step (113)], thereby causing all the disk drives 50 to 59 to each carry out the seek operation so as to be positioned at a target track, and then proceeds to Step (114).

This makes the spare storage disk drive 59 carry out the seek operation as well.

Sequence (5)—the processor 8 waits for reports of completion of the seek operation from the respective device controllers 40 to 49. Upon receipt of such reports, the processor 8 checks whether or not it has received a report concerning the presence of an error so as to check an error state [Step (114)]. If no error exists, the processor 8 proceeds to Step (115).

On the other hand, if there is an error due to some failure or the like, the processor 8 checks whether or not the spare storage disk drive 59 is in an error state [Step (116)]. If the spare storage disk drive 59 is in the error state, the processor 8 sets the spare disk error flag 81 to an on state [Step (117)], and proceeds to Step (115).

If the spare storage disk drive 59 is not in the error state, the error has occurred in the other disk drives 50 to 58, which means a failure of an entire disk array system. Thus, the processor 8 executes an error handling process (1) so as to inform the host device 1 of the presence of the error, and returns to the main program [Step (118)].

Sequence (6)—subsequently, the processor 8 decodes a next command following the seek command. If the decoded command represents a command other than read transfer and write transfer [Steps (115, 116)], the processor 8 executes the corresponding process to all the disk drives except the spare storage disk drive 59 [Step (119)], and proceeds to Step (123).

Sequence (7)—on the other hand, determining that the decoded command represents the read transfer, the processor 8 checks the state of the spare storage disk drive 59 by checking the spare disk error flag 81 and the spare disk not-ready flag [Step (120)]. If the spare disk drive 59 is in the ready state and no error has been reported during the seek operation executed immediately before, the processor 8 sends a read transfer command to the device controllers 40 to 49 for all the physical devices 50 to 59 [Step (122)], thereby causing all the disk drives 50 to 59 to read and transfer data.

At this stage, in the device controller 49 which is connected to the spare storage disk drive 59 and which is instructed to read and transfer data by the processor 8, the command controller 99 instructs the read transfer to the spare storage disk drive 59, and the read data is stored in the data buffer 109. The device controller 49 sends a report indicating completion of the data transfer to the processor 8 without transferring the read data to the data transfer controller 7.

Conversely, if the spare storage disk drive 59 is not in the ready state, or if an error has been reported in the seek operation executed immediately before, the processor 8 sends the read transfer command to the device controllers 40 to 48 for the disk drives 50 to 58 other than the spare storage disk drives [Step (121)], thereby causing the other disks 50 to 58 to read and transfer the data.

Sequence (8)—upon completion of the read transfer, the processor 8 checks the error state [Step (123)]. If there is no error, the processor 8 returns to the main program. On the other hand, if there is an error, the processor 8 discriminates whether or not the error has occurred in the spare storage disk drive 59 [Step (124)]. If the spare storage disk drive 59 is in the error state, the processor 8 returns to the main program after setting the spare disk error flag 82 [Step (125)]. If the spare storage disk drive 59 is not in the error state, the error has occurred in the other disk drives 50 to 58, which means a failure of an entire disk array system [Step (126)]. Thus, the processor 8 executes an error handling process (1) so as to inform the host device 1 of the presence of the error, and returns to the main program.

In this way, when an access is made from the host device, the unnecessary spare storage disk drive 59 is also caused to carry out the seek operation and the data transfer operation, thereby confirming the normal operation of the seek and data transfer operations of the spare storage disk drive 59.

Accordingly, in a host operation in which the spare storage disk drive 59 operates in cooperation with other disk drives 50 to 58, the normal operation of the spare storage disk drive 59 can be confirmed and this confirmation is made in response to an access from the host device. Therefore, the diagnostic process can be applied to the spare storage disk 59 even if the access frequency of the host device is high.

Further, since the diagnostic process is executed only in the case of the read transfer, considering that some data is written in the spare storage disk drive 59, the data stored in the spare storage disk drive 59 can be protected. Hereafter, the description of a second embodiment will be given in detail with reference to FIGS. 6(A) and 6(B).

The construction of the second embodiment is same as the one shown in FIG. 3, and a main program thereof is same as the one shown in FIG. 4. Accordingly, no description will be given on these points.

In the second embodiment, a diagnosis command is sent from a host device 1 in order to test the disk array system or confirm an operation thereof. Steps (208) to (219) in FIGS. 6(A) and 6(B) are the same as Steps (108) to (119) in FIGS. 5(A) and 5(B), and accordingly a flowchart is described from Step (229), without giving any description of these steps (208) to (219).

Sequence (7)—on the other hand, determining that a decoded command represents a read transfer [Step (220)], a processor 8 discriminates whether or not the read transfer is a diagnostic read transfer [Step (221)]. In the case of the normal read transfer, the processor 8 sends a read transfer command to device controllers 40 to 48 for disk drives 50 to 58 other than a spare storage disk drive 59, thereby causing the disk drives 50 to 58 to read and transfer data, and proceeds to Step (225).

Conversely, if the read transfer is the diagnostic read transfer, the processor 8 checks the state of the spare storage disk drive 59 by checking a spare disk error flag 81 and a standby disk not-ready flag [Step (222)]. If the spare storage disk 59 is in a ready state and no error has been reported during a seek operation executed immediately before, the processor 8 sends a read transfer command to the device controllers 40 to 49 for all the physical devices 50 to 59 [Step (223)], thereby causing all the disk drives 50 to 59 to read and transfer data.

Conversely, if the spare storage disk drives 59 is not in the ready state, or if an error has been reported in the seek operation executed immediately before, the processor 8 sends the read transfer command to the device controllers 40 to 48 for the disk drives 50 to 58 other than the spare storage disk 59 [Step (224)], thereby causing the other disk drives 50 to 58 to read and transfer the data.

At this stage, in the device controllers 40 to 49 which are connected to the disk drives 50 to 59 and are instructed to carry out the read transfer from the processor 8, command controllers 90 to 99 instruct the disk drives 50 to 59 to read and transfer the data, and the read data are stored in data buffers 100 to 109. The device controllers 40 to 49 send reports indicating completion of the data transfer to the processor 8 without transferring the read data to a data transfer controller 7.

In the respective disk drives 50 to 59 are written some data shown in FIG. 7, and these data are transferred together with CRCs and IDs including ECCs to the data buffers 100 to 109 which check the data so as to detect a medium defect and report the result to the processor 8.

Sequence (8)—upon completion of the read transfer, the processor 8 checks whether or not there has been an error in transferring the data [Step (225)]. If there has been an error, the processor 8 executes a transfer error handling process (3) [Step (226)], and returns to the main program. If there has been no such error, the processor 8 discriminates whether or not there has been any error caused by the medium defect [Step (227)]. If there has been any medium defect error, the processor 8 reports it to the host device 1 [Step (228)] and returns to the main program. If there has been no such error, the processor 8 reports to the host device 1 that the process was completed normally [Step (229)], and returns to the main program.

Here, since the recording medium defect error is not a fatal defect and the data can be reconstructed in the disk array device, the processor 8 may incorporate a history of defect information and the medium defect error may be informed to the host device 1 by means of a sense command or the like rather than by means of instantaneous execution of the error handling process.

In this example, since a diagnosis command is sent from the host device, the diagnosis process can be applied to the spare storage disk drive in connection with the host operation. Further, a medium defect can be also detected, and the diagnosis process can be also applied to the other disk drives 50 to 58 in the case of a test, or on other occasions.

Figure 8:
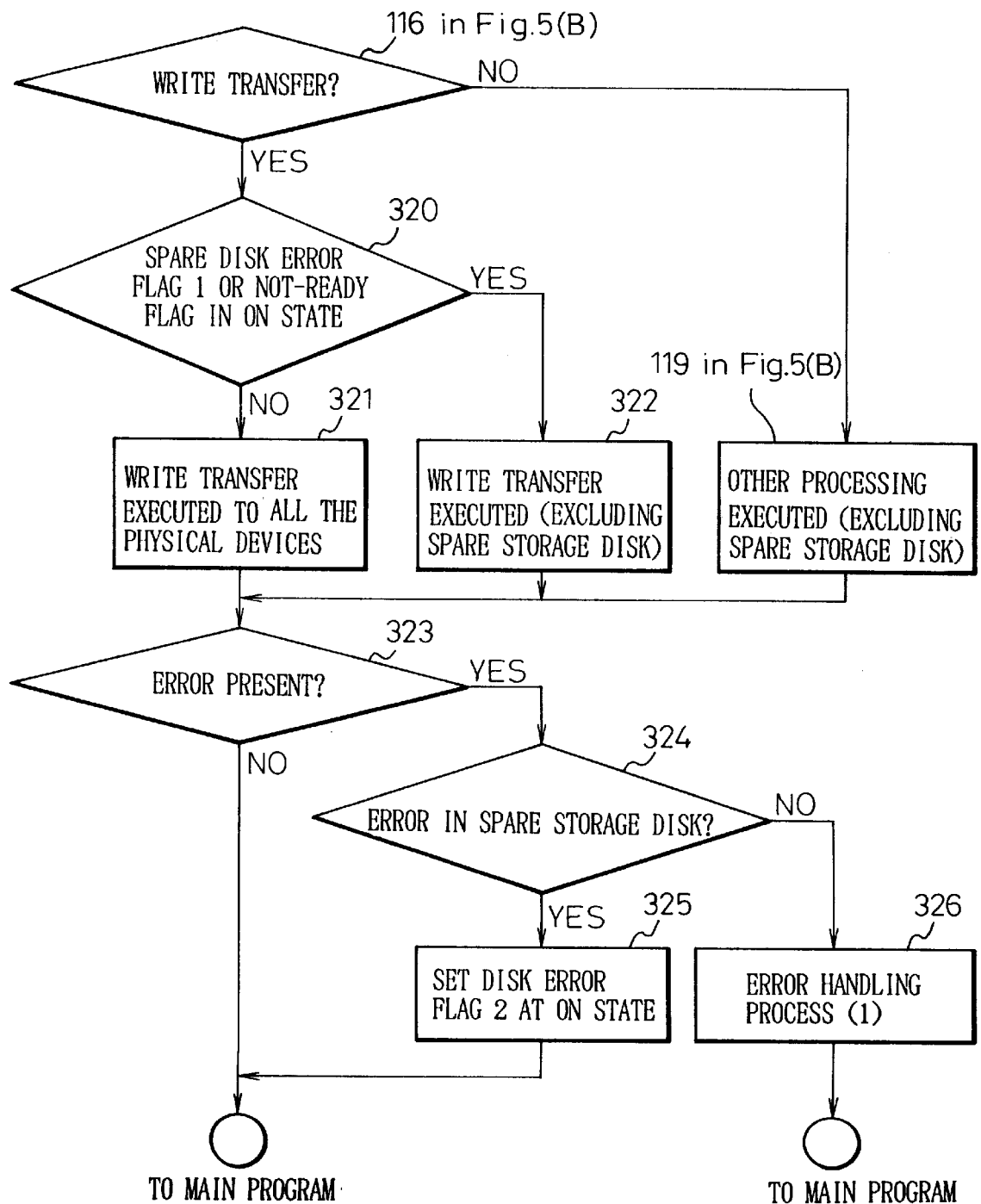
FIGS. 8 is a flowchart showing a processing in a third embodiment according to the present invention.

FIG. 8 is a flowchart showing a process in the third embodiment of the present invention.

A processor 8 decodes a command from a channel interface controller 6 and executed the process similar to the first embodiment [FIGS. 4, 5(A) and 5(B)].

In FIG. 5B described before, when the command is a write transfer command, the processor 8 examines the state of the spare storage disk drive 59 based on the spare disk error flag 81 and the not-ready flag [Step (320)], and sends the write transfer requirement to all the physical devices 50 to 59 [Step (321)], when the examined state is the ready state and no error has been reported by the seek command executed just before.

Here, the data transferred from the host device 1 are written into the data storage disk drives 50 to 57, and parity data generated from the data transferred from the host device 1 are written onto the redundant disk drive 58. Furthermore, the device controller 49 generates dummy data from such write data and writes that data onto the spare storage disk drive 59.

When the spare storage disk drive 59 is not in the ready state and an error has been reported by the seek command executed just before, the write transfer requirement is sent to the device controller 40 to 48 of the disk drives 50 to 58, but not to that of the spare storage disk drive 59, and the data transferred from the host device 1 and the parity data that is generated are written onto the disk drives 50 to 58 [step (322)].

After the write transfer process has been completed, the processor 8 checks whether or not there is an error [Step (323)]. When there is no error, the operation returns to the main program. When there is an error, the processor 8 discriminates whether or not it is an error in the spare storage disk drive 59 [Step (324)]. When it is an error in the spare storage disk drive 59, a spare disk error flag 82 is set to an on state [Step (325)] and the processor 8 returns to the main program. When it is not an error in the spare storage disk drive 59, then it is an error in the other disk drives 50 to 58, and the whole disk array system becomes faulty. The processor 8 therefore executes the error handling process (1) to inform the host device 1 of the fact that the failure of the disk array system has occurred [Step (326)], and the processor 8 returns to the main program.

As described above, the seek operation and write transfer operation are executed even for the spare storage disk drive 59 that is not necessary in response to an access from the host device 1, in order to confirm the normal operation of the spare disk drive 59.

Figure 9:
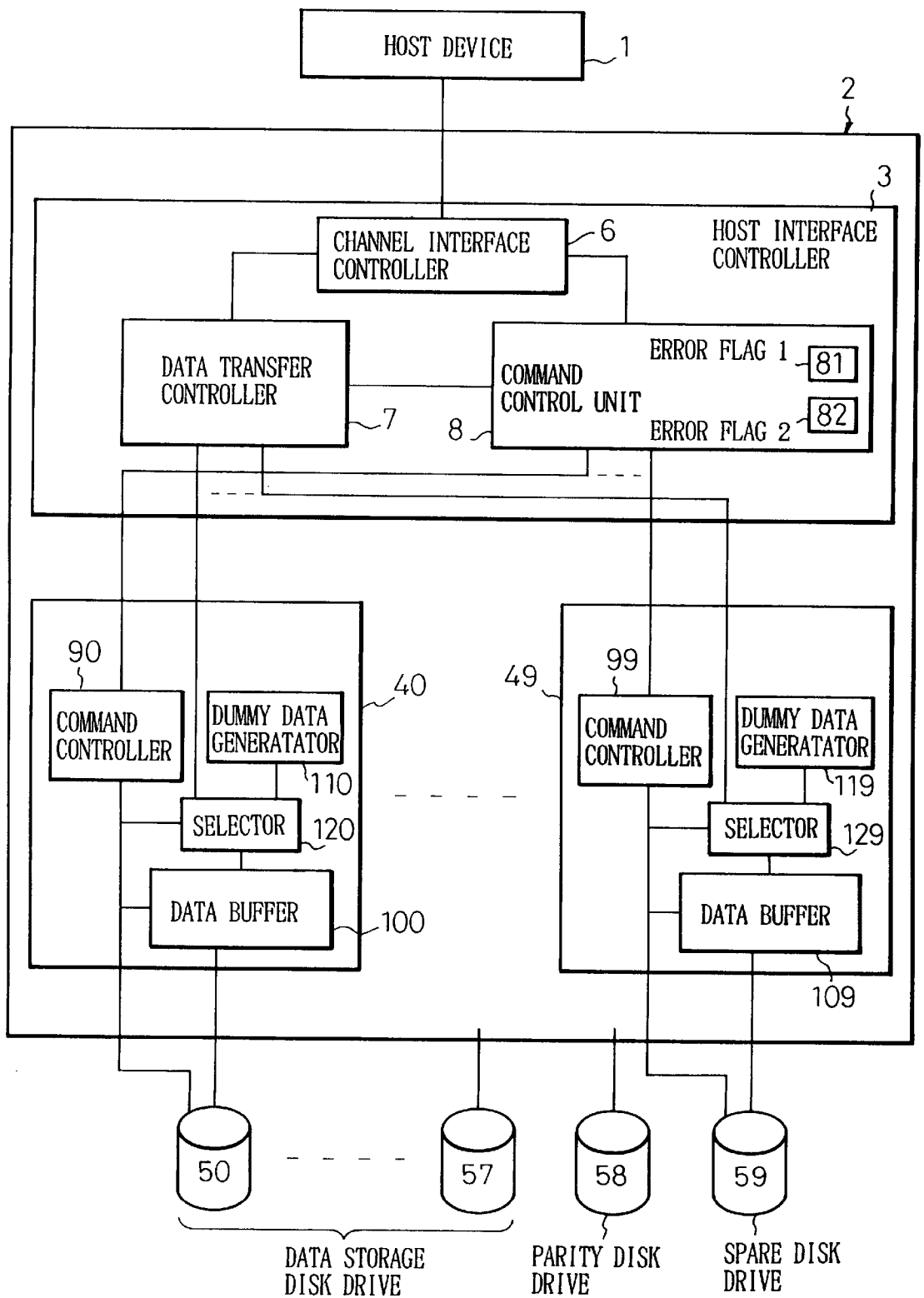
FIG. 9 is a block diagram showing the combination of first and third embodiments according to the present invention.

As illustrated in FIGS. 5(A) and 5(B), the first embodiment has dealt with the read transfer only. On the other hand, the third embodiment as shown in FIG. 8 deals with the write transfer processing only. It is, however, also possible to effect the diagnosis based on the combination of the first and third embodiments, as illustrated in FIG. 9 by a block diagram.

According to the third embodiment, dummy data are generated by the respective dummy data generators 110 to 119 of a plurality of device controllers 40 to 49. Especially, one block of dummy data can be generated by the dummy data generator 119 of the device controller 119 so as to be written onto the storage disk drive 59. It is, however, also allowable to write onto the spare storage disk drive 59 the actual data transferred from the host device 1 or the parity data that is prepared for a redundancy check, as illustrated in FIG. 9. Any one of these three kinds of data can be selected by a selector 129 (120–129).

In addition to the foregoing embodiments, the present invention can be modified in the following manners.

(1) The foregoing embodiments are described with respect to a disk array system provided with magnetic a disk drives, but the present invention is applicable to disk system provided with optical disk drives or the like accompanying mechanical operations.

(2) Although one spare storage disk drive is provided in the foregoing embodiments, two or more spare storage disk drives may be provided.

While the present invention is described as related to the embodiments, various changes and modifications may be made in the present invention without departing from the spirit and scope thereof.

As described above, the present invention represented by some preferred embodiments demonstrates the following effects.

(1) A spare storage disk drive is caused to operate at the same time when an access is made to other disk drives so as to be diagnosed. Accordingly, in event of a failure, the diagnosis can be carried out in the same state as in the case where the spare storage disk drive is being used. Therefore, the spare storage disk drive can be diagnosed in cooperation with other disk drives.

(2) Since data stored in the spare disk drive is not transferred from a corresponding device controller, the diagnosis can be performed at high speed.

Figure 10:
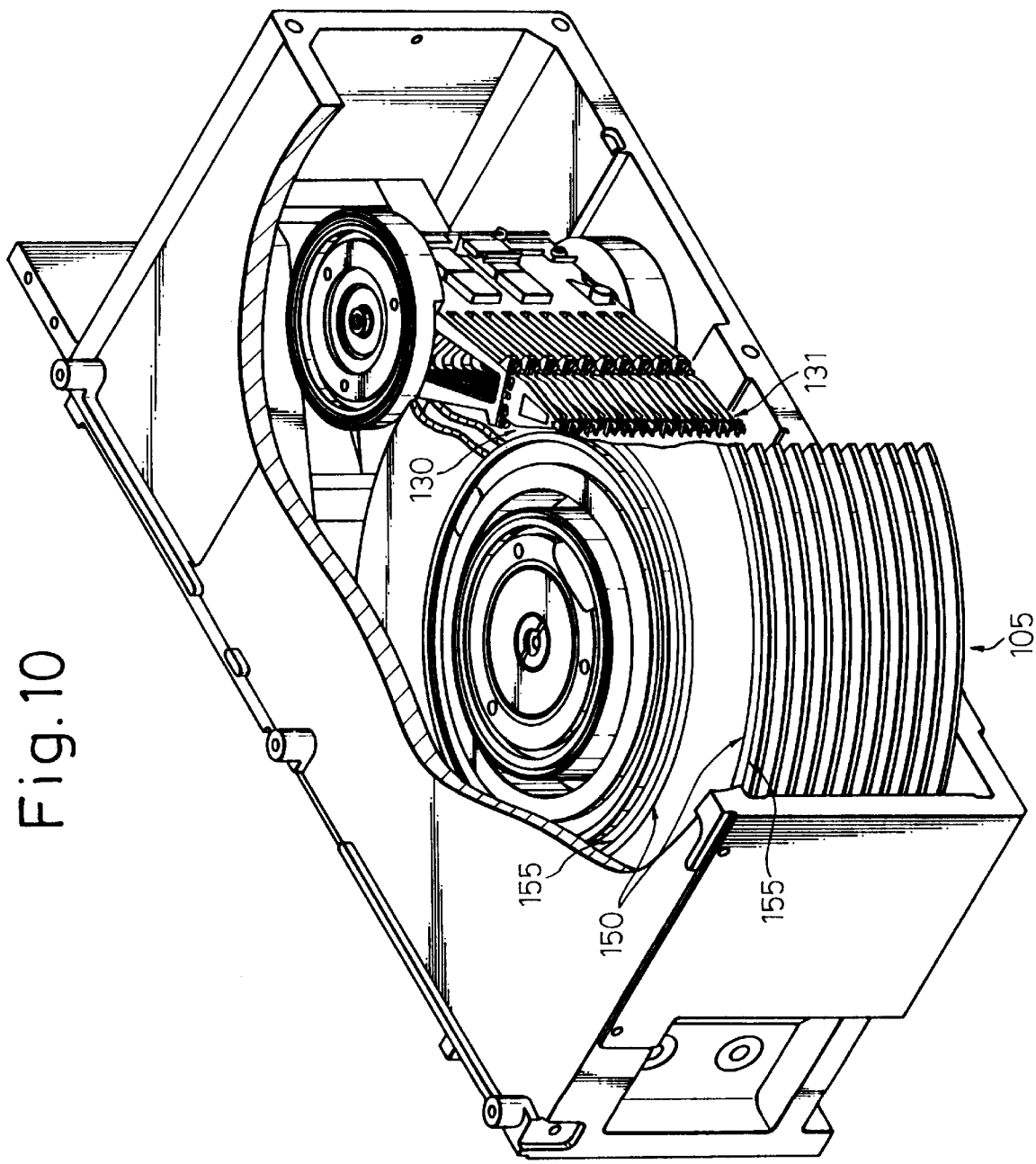
FIG. 10 is a perspective view, partially cut away, showing a mechanism of a magnetic disk drive.

Here, in order to facilitate understanding of the embodiments according to the present invention, a perspective view, partially cut away, showing a mechanism of one magnetic disk drive is illustrated in FIG. 10. As seen from this figure, a plurality of disks (e.g., eleven disks) 105 are rotated simultaneously. The tracks on a recording surface of each disk 105 are written with a predetermined data pattern. However, the tracks at both ends of the inner zone and the outer zone of the disk 105 are formed as guard bands 150 in which a particular pattern is written, instead of a data pattern, which particular pattern is used for stopping a seek operation of two kinds of heads 130 and 131. These heads 130, 131 are provided on the upper and lower surfaces of each disk 105, respectively. Further, at the inner and the outer sides of the guard band 150, an erase zone 155 is formed for mechanically stopping the heads 130 and 131.

Figure 11:
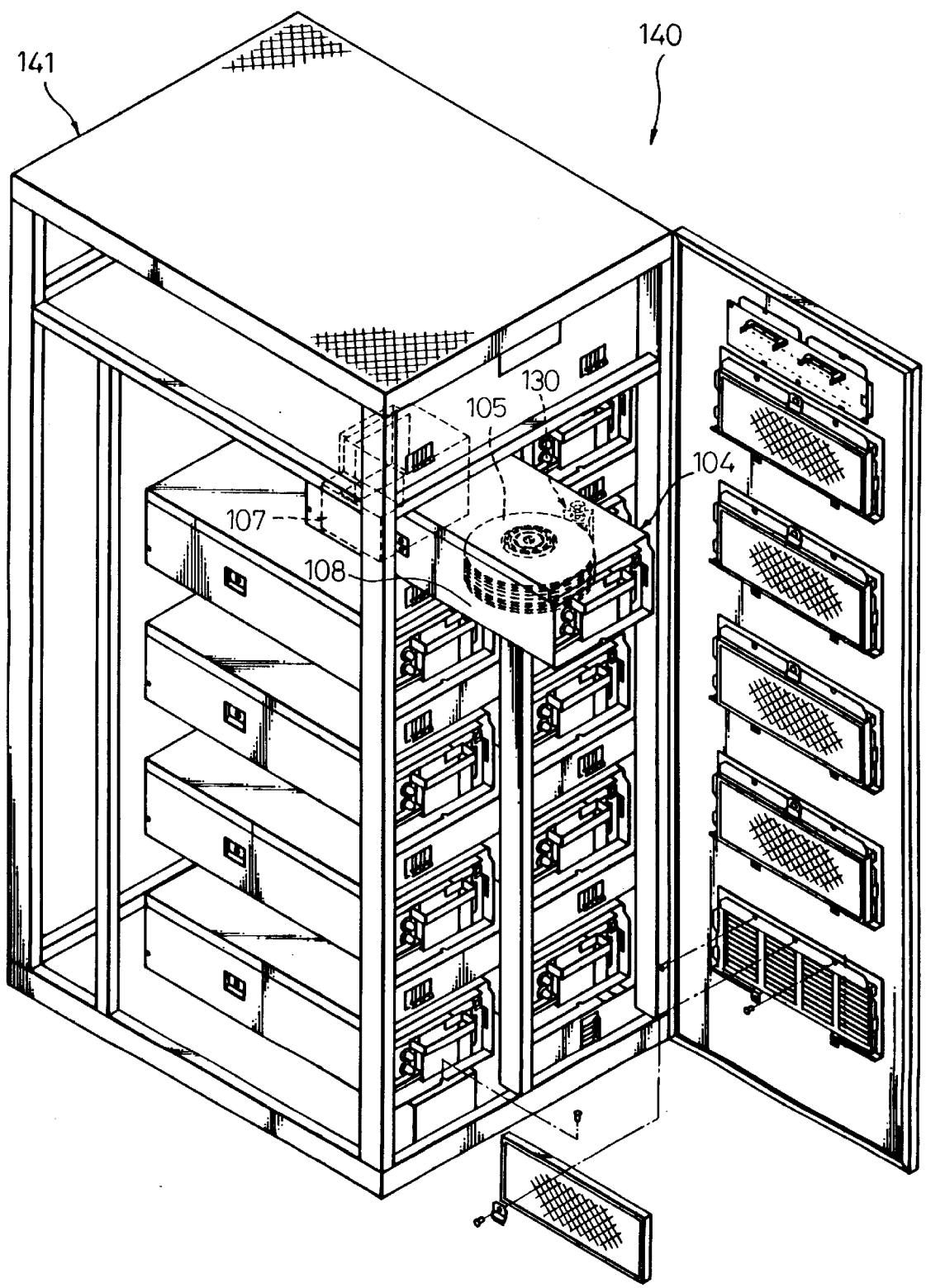
FIG. 11 is a perspective view showing an overall magnetic disk array device.

Preferably, the present invention is adopted to a disk array drive 140 as shown in FIG. 11, wherein reference numeral 104 denotes a magnetic disk drive that includes the disks 105 and 141 a housing that can accommodate a plurality of magnetic disk drives. In this case, the disk array device are composed of eight disk drives for data transfer, one parity disk drive and one spare storage disk drive.

The magnetic disk drives 104 constituting each unit of disk array device comprise a disk module 108. The disk module 108 serves to contain the disks 105 and a power supply box 107 inside the disk module 108 per se.

Each magnetic disk drive 104 is constructed to be easily inserted into the housing 141 and also easily removed therefrom, so that a maintenance operation can be rapidly performed when a failure, etc., has occurred.

Figure 12:
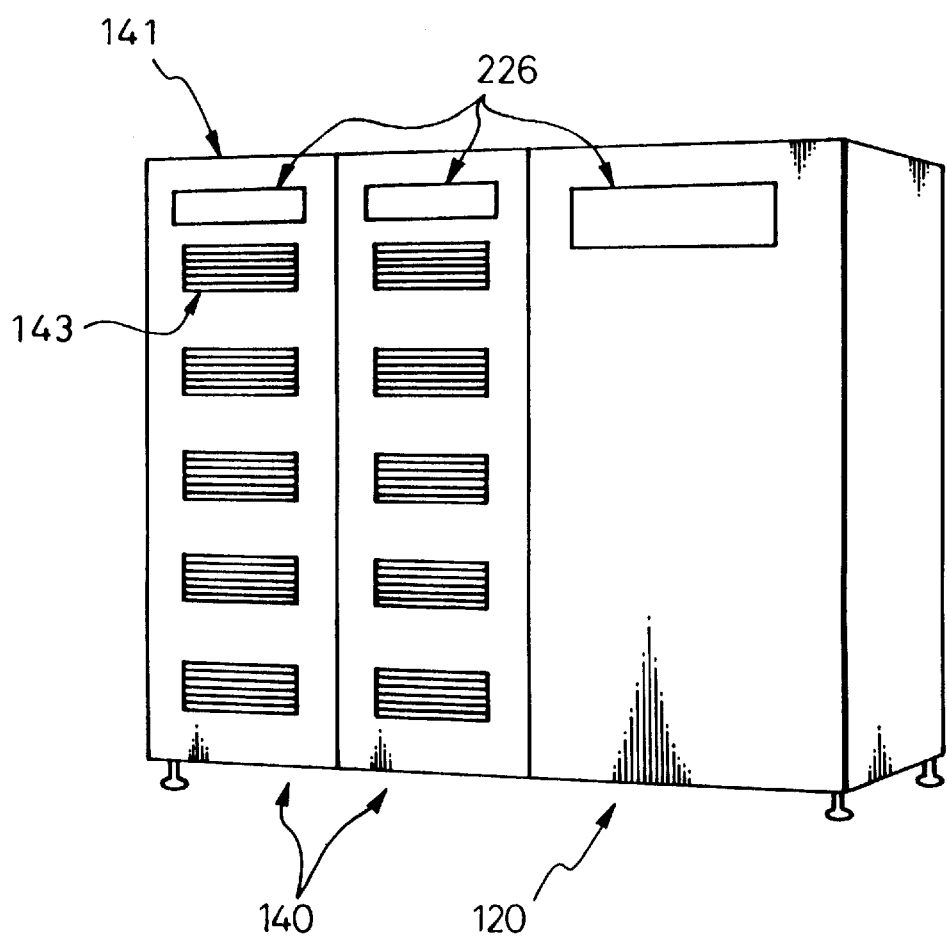
FIG. 12 is a perspective view showing an appearance of a plurality of disk array devices to which the present invention is applied.

Further, in order to clarify the whole construction of a disk array system to which the present invention is applied, an appearance of a plurality of disk array devices including the operation panel 226 is illustrated in FIG. 12.

In FIG. 12, a disk array system is constituted by a plurality of disk array devices, e.g., two disk array devices 140 and a disk array control unit 120 for controlling these disk array devices 140. The two disk array drives 140 and the disk controller are arranged to be contained in a housing 141. In this case, the front side of the housing 141 at each disk array device 140 is provided with the operation panel 226, in addition to a plurality of ventilation windows 143 for radiating heat generated from a plurality of disk drives (not shown in FIG. 12). Further, the front side of the housing 141 at the disk array control unit 120 is also provided with the operation panel 226.

Figure 13B:
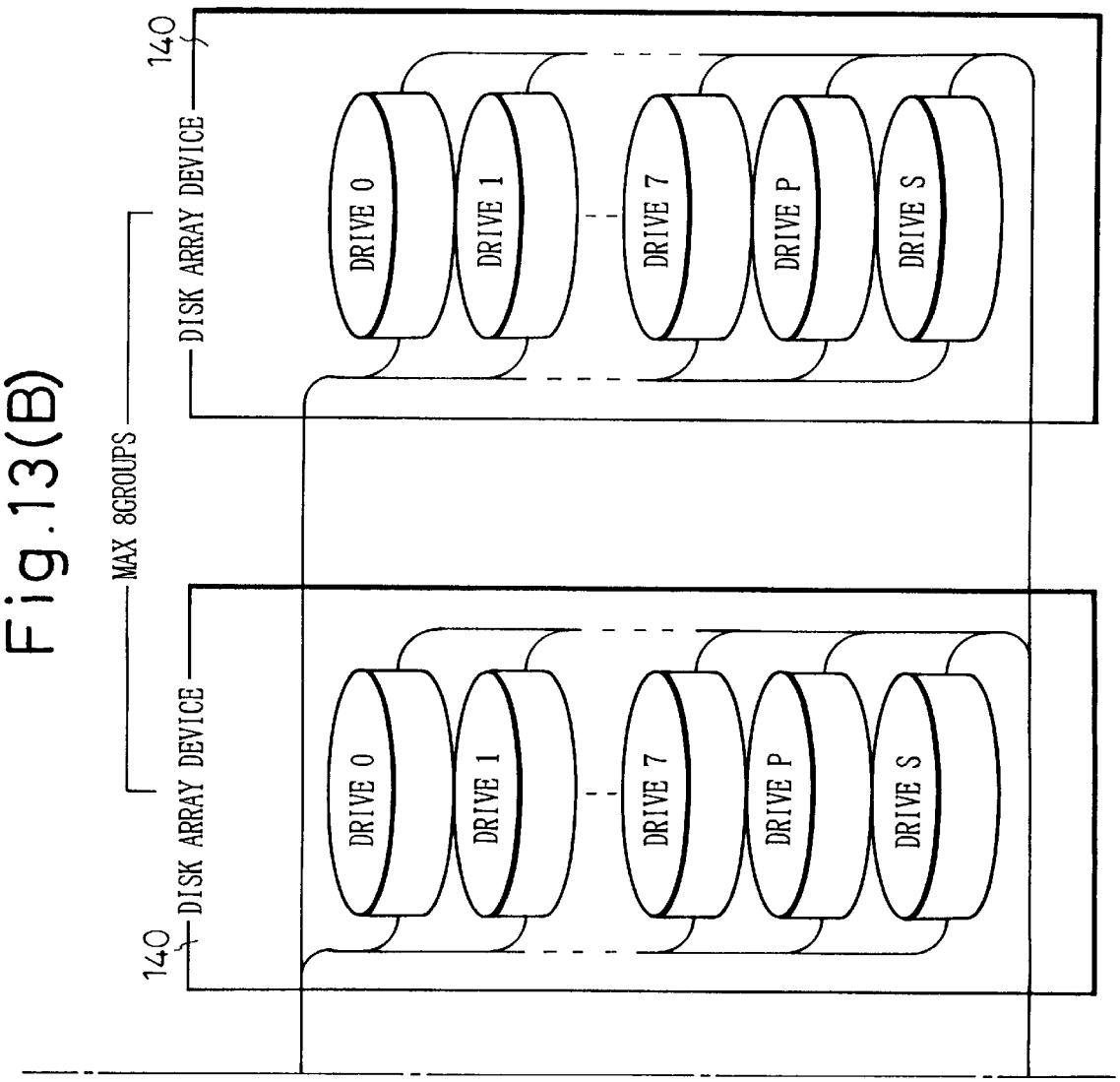

Finally, block diagrams of a disk array control unit 120 and a plurality of disk array devices 140 controlled by the disk array control unit 120 are illustrated in FIGS. 13(A) and 13(B), respectively. In this case, eight disk drives at maximum can be controlled by the disk controller 120 having the respectively corresponding directors, as described below.

In FIG. 13(A), high-speed optical channels A, C, B and D, and channel interface controller e.g., high-speed optical control modules each functioning as an optical/electric interface (O/E interface), are provided to enable data to be transferred at high speed between the channel and the disk array devices 140. The disk array control unit 120 consists of two directors. Each director consists of two modules: the optical control module as described above; and an array control module to control the disk array devices 140.

The latter module is divided into ten device controllers to control the respectively corresponding disk drives (Drive 0–7, Drive P and Drive S as shown in FIG. 13(B)) and an array controller to transfer the data to or from each of the device controllers.

The two directors in the disk array control unit are independent of each other. These directors can control two groups of disk array devices simultaneously.

In this case, the operation panel 226 (FIG. 12) can display the status information of each of two disk array devices.

What is claimed is:

1. A method for diagnosing a plurality of disk drives in at least one disk array device including a plurality of data storage disk drives, a redundant disk drive for a redundancy check, a spare storage disk drive, said spare storage disk drive storing data which is recreated when a failure occurs in a data storage disk drive, and a disk array control unit that is connected in parallel with said plurality of disk drives and that is adapted to access said plurality of disk drives in response to an access from a host device for accessing said data storage disk drive only, wherein said method comprises:

a step of simultaneously accessing said spare storage disk drive as well as said plurality of data storage disk drives and said redundant disk drive, when a data transfer requirement issued by said host device is a read transfer requirement that addresses the plurality of data storage disk drives even when said read transfer requirement does not require access to said spare disk drive; and a step of diagnosing said spare storage disk drive during simultaneous accessing of said data storage disk drives so that said spare storage disk drive may be tested.

2. A method as set forth in claim 1, wherein said disk array control unit performs seek operations and data transfer operations for said spare storage disk drive to diagnose said spare storage disk drive.

3. A method as set forth in claim 1, wherein said disk array control unit accesses said spare storage disk drive as well as said plurality of data storage disk drives and said redundant disk drive, when the data transfer requirement from said host device is a write transfer to diagnose said spare storage disk drive.

4. The method of claim 1 wherein said disk array control unit has information representing the state of said spare storage disk drive, and said disk array control unit is operative to refer to said information when receiving a seek command from said host device.

5. The method of claim 1 wherein said disk array control unit is operative to access all of the disk drives except said spare storage disk drive when a data transfer requirement issued by said host device is a write transfer requirement.

6. A disk array device that is connectable to a host device and includes at least one data storage disk drive, a redundant disk drive for a redundancy check, and a spare storage disk drive, said spare storage disk drive storing data which is recreated when a failure occurs in said data storage disk drive, comprising:

a host interface controller which receives an access command issued from said host device; and a disk array control unit for controlling said at least one data storage disk drive, said redundant disk drive, and said spare storage disk drive, in accordance with said access command through said host interface controller, said disk array control unit being operative to access both said at least one data storage disk drive and said spare storage disk drive so as to diagnose said spare storage disk drive during simultaneous access of said data storage disk drives, when a data transfer requirement issued by said host device is a read transfer requirement for said at least one data storage disk drive even when said data transfer requirement does not require access to said spare storage disk drive.

7. A disk array device as set forth in claim 6, wherein said disk array control unit is operative to perform seek operations and data transfer operations for said spare storage disk drive for the purpose of diagnosing said spare storage disk drive.

8. A disk device as set forth in claim 6, wherein said disk array control unit is operative to access said spare storage disk drive as well as said plurality of disk drives including said at least one data storage disk drive and said redundant disk drive, when a data transfer requirement from said host device is a write transfer to diagnose said spare storage disk drive during simultaneous access of said data storage disk drives so that said spare storage disk drive may be tested at any time during said access from said host device without disturbing said data transfer requirement.

9. A disk array device as set forth in claim 8, wherein said disk array control unit is operative to access said spare storage disk drive as well as said plurality of disk drives including said at least one data storage disk drive and said redundant disk drive, when said data transfer requirement from said host device is a diagnosis, and wherein said disk array control unit is operative to diagnose said spare storage disk drive and to write data onto said spare storage disk drive.

10. A disk array device as set forth in claim 9, wherein said diagnosis includes seek operations and data transfer operations for said spare storage disk drive.

11. A disk array device as set forth in claim 8, wherein said disk array control unit is operative to perform seek operations and data transfer operations for said spare storage disk drive for the purpose of diagnosing said spare storage disk drive.

12. A disk array device as set forth in claim 9, wherein said diagnosis includes seek operations, data transfer operations, and recording medium defect detecting operations for the storage disk drives.

13. A disk array device as set forth in claim 6, further comprising a plurality of disk drives, a first disk drive of said plurality of disk drives including said redundant disk drive, a second disk drive of said plurality of disk drives including said spare storage disk drive, and said remaining plurality of disk drives including said at least one data storage disk drive.

14. A disk array device as set forth in claim 13, wherein said disk array control unit further comprises a means for dividing data sent from said host interface controller into a plurality of data blocks, and storing each of said data blocks into respective data storage disk drives.

15. A disk array device as set forth in claim 13, wherein said disk array control unit is operative to access said spare storage disk drive as well as said plurality of disk drives including said at least one data storage disk drive and said redundant storage disk drive.

16. A disk array device as set forth in claim 15, wherein said disk array control unit is operative to access said spare storage disk drive as well as said plurality of disk drives including said at least one data storage disk drive and said redundant disk drive, when said data transfer requirement from said host device is for diagnosing said spare storage disk drive, and said disk array control unit is not operative to transfer data to said host device.

17. A disk array device as set forth in claim 16, wherein said diagnosing includes a seek operation and a data transfer operation for said spare storage disk drive.

18. A disk array device as set forth in claim 15, wherein said disk array control unit is operative to perform seek operations and data transfer operations for said spare storage disk drive for the purpose of diagnosing said spare storage disk drive.

19. A disk array device as set forth in claim 16, wherein said diagnosing includes seek operations, data transfer operations, and recording medium defect detecting operations for said disk drives.

20. A disk array device as set forth in claim 6, wherein said access command is a seek command.

21. A disk array device as set forth in claim 6, wherein said access command is a read command.

22. A disk array device as set forth in claim 6, wherein said disk array control unit comprises a means for checking whether or not an error occurs when said access command is being carried out.

23. The disk array device of claim 6 wherein said disk array control unit has information representing the state of said spare storage disk drive, and said disk array control unit is operative to refer to said information when receiving a seek command from said host device.

24. The disk array device of claim 6 wherein said disk array control unit is operative to access all of the disk drives except said spare storage disk drive when a data transfer requirement issued by said host device is a write transfer requirement.

* * * * *